W. G. STOCKHAM.
ARMOR FOR VEHICLE TIRES.
APPLICATION FILED JULY 3, 1920.

1,385,159. Patented July 19, 1921.

Inventor
W. G. Stockham.
By Lacy & Lacy, Attorneys

UNITED STATES PATENT OFFICE.

WILLIAM G. STOCKHAM, OF PIQUA, OHIO.

ARMOR FOR VEHICLE-TIRES.

1,385,159.  Specification of Letters Patent.  Patented July 19, 1921.

Application filed July 3, 1920. Serial No. 393,848.

*To all whom it may concern:*

Be it known that I, WILLIAM G. STOCKHAM, citizen of the United States, residing at Piqua, in the county of Miami and State of Ohio, have invented certain new and useful Improvements in Armors for Vehicle-Tires, of which the following is a specification.

This invention relates to improvements in tire armors especially adapted for use in connection with pneumatic tires.

An important object of this invention is to provide a tire armor having novel means for protecting the tire from ice, stones and the like and also provided with novel means for preventing circumferential and lateral skidding of a vehicle.

A further object of the invention is to provide a tire armor having simple means whereby the same may be readily and conveniently applied to a vehicle wheel without materially altering the construction of the wheel or interfering appreciably with the shock absorbing qualities of the same.

A further object of the invention is to provide a tire armor which is simple, durable in use and cheap to manufacture.

Other objects and advantages of the invention will be apparent during the course of the following description.

In the accompanying drawing forming a part of this application and in which like numerals are employed to designate like parts throughout the same, Figure 1 is a fragmentary side elevation of a vehicle wheel having the improved armor applied thereto.

Figure 3:
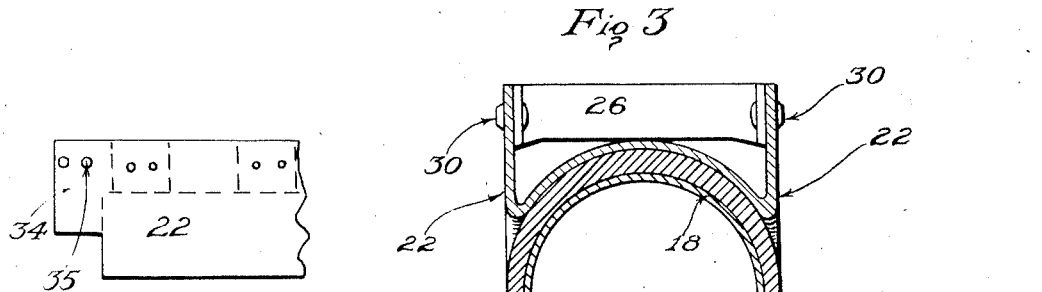
Fig. 3 is a vertical transverse section taken on line 3—3 of Fig. 1.
Figure 4:
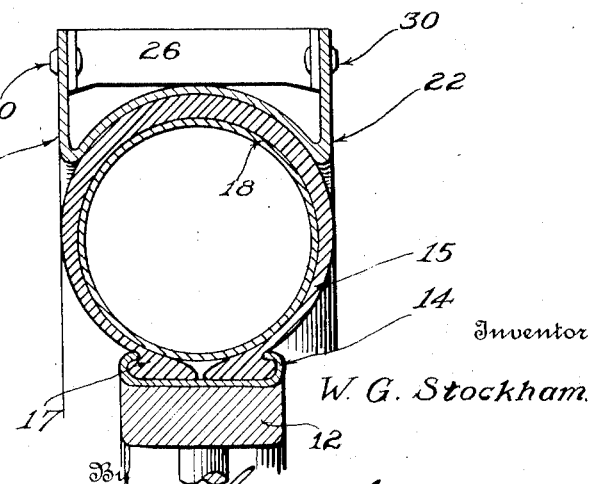
Fig. 4 is a detail elevation of the improved tire armor, the view illustrating the means for connecting the segmental sections.

In the drawing, wherein for the purpose of illustration is shown a preferred embodiment of the invention, the numeral 10 generally designates a wheel which includes radial spokes 11 having connection with a felly 12 about which a rim 14 is detachably secured. As illustrated in Fig. 3, the tire casing 15 is secured by annular beads 17 between the flanges of the rim 14 and an inner tube 18 is arranged within the tire casing and is adapted to receive a quantity of air which serves as a sustaining means for the vehicle.

The improved armor forming the subject matter of this application comprises one or more segmental sections 20 adapted to be arranged about the tire casing to protect the same from ice and so forth and also to provide a means for preventing circumferential and lateral skidding. Each segmental section 20 is formed from an elongated length of metal having its longitudinal edge portions extended outwardly in parallel relation to provide a pair of annular flanges 22. Each segmental section is curved transversely between said outwardly extended annular flanges as indicated at 24 to conform to the transverse curvature of the tire to which it is applied.

Figure 1:
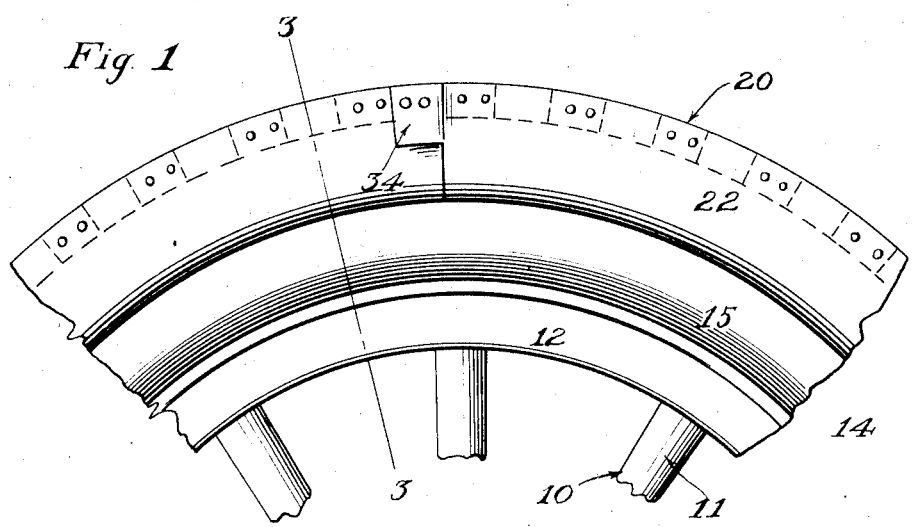
Figure 2:
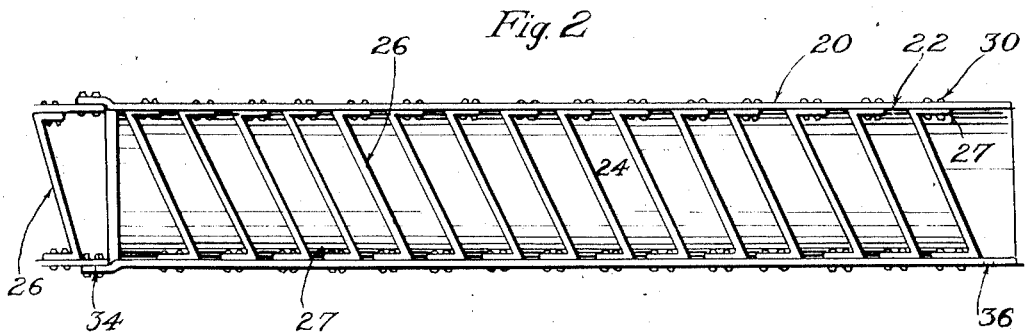
Fig. 2 is a plan view of one of the segmental sections of the armor.

With particular reference to Figs. 2 and 3, it will be noted that a plurality of cleats 26 are extended diagonally across each segmental section and have their end portions extended laterally to form attaching members 27 which are secured to the inner sides of the flanges 22 by means of rivets 30 or the like. The outer edges of the diagonally extending cleats 26 are disposed substantially flush with the outer edges of the outwardly extending annular flanges 22 so as to form uniform ground engaging surfaces. The diagonally extending cleats 26 are strengthened and are prevented from collapsing by reason of the fact that the inner edges contact with the transversely curved portion of the segmental sections.

The flanges 22 of each segmental section are extended at one end to form overlapping arms 34 having apertures 35 adapted to aline with apertures 36 in the adjacent flanges for the reception of fastening devices. By this means, the segmental sections may readily and conveniently be secured about the tire and when applied will be absolutely prevented from displacement. No fastening devices are connected permanently to the wheel or rim so that the appearance of the wheel is not marred by the application of the device.

In operation, the flanges 22 serve as an efficient means for preventing lateral skidding and the diagonal cleats 26 prevent circumferential skidding and also afford excellent traction.

It is to be understood that the form of the invention herewith shown and described is to be taken as a preferred embodiment of the same and that such minor changes may be made as will remain within the spirit of the invention and the scope of what is claimed.

Having thus described the invention, what is claimed as new is:

1. A tire armor comprising a plurality of segmental sections secured together end to end and each consisting of a transversely arched web, parallel flanges projecting outwardly from the side edges of said web, and spaced cleats extending between said flanges and having their ends secured rigidly to the inner sides of the flanges, the cleats resting at their centers upon the arched web and the outer edges of the cleats being flush with the outer edges of the flanges.

2. A tire armor comprising a plurality of segmental sections, each consisting of a transversely arched web, parallel flanges projecting outwardly from the side edges of the web, and cleats resting at their centers upon the arched web and extending obliquely between the flanges and having their opposite end portions extending longitudinally of the segmental section in opposite directions and secured rigidly to the inner sides of the parallel flanges but free of the arched web, the flanges on each section having offset extensions at one end overlying and secured rigidly to the ends of the flanges on an adjacent section, said ends of the adjacent section being parallel and abutting the said offset extensions.

In testimony whereof I affix my signature.

WILLIAM G. STOCKHAM. [L. S.]